United States Patent Office 2,710,077
Patented June 7, 1955

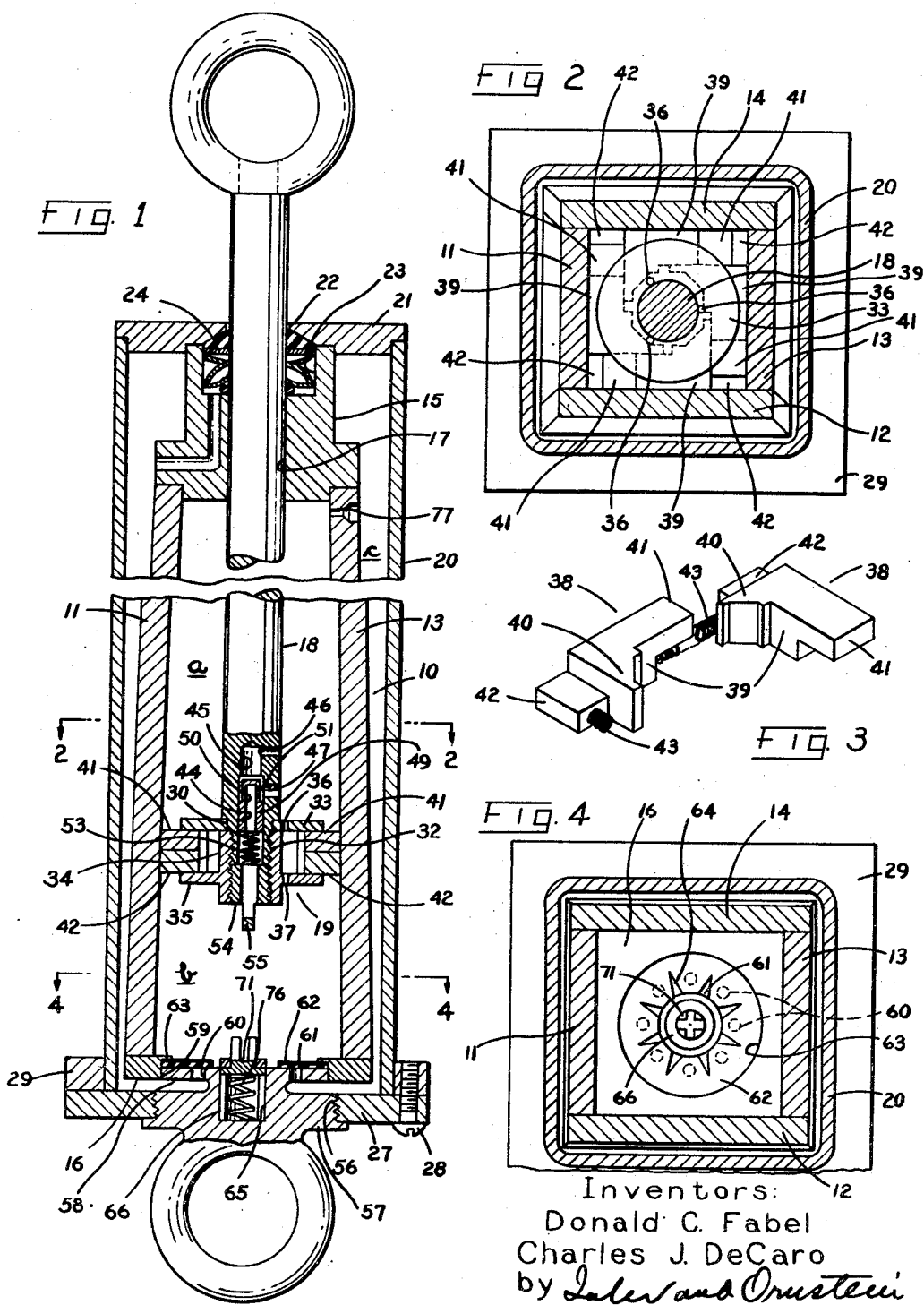
Inventors:
Donald C. Fabel
Charles J. DeCaro
by Daley and Ornstein
Their Attorneys

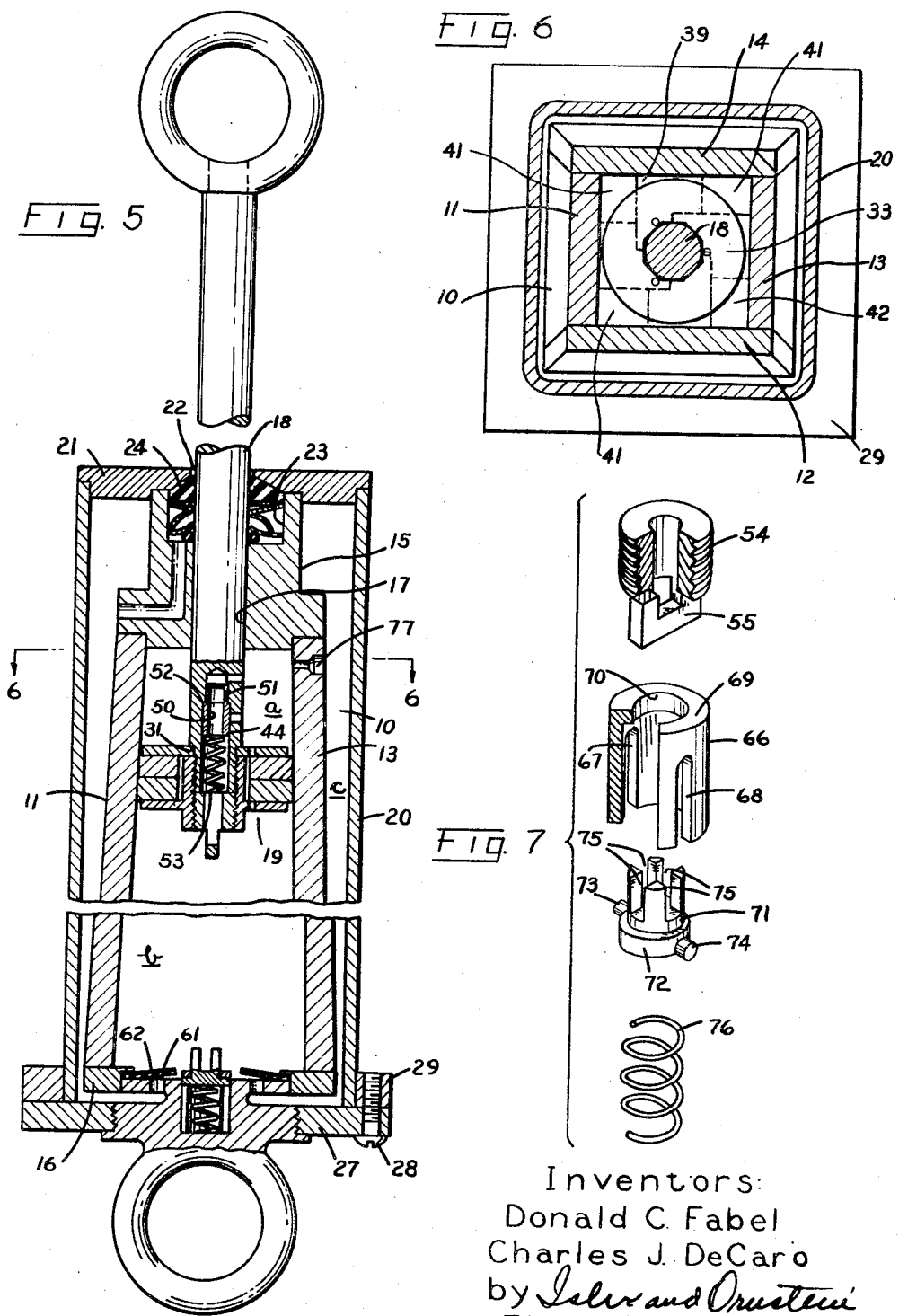

2,710,077

HYDRAULIC SHOCK ABSORBER

Donald C. Fabel, Cleveland Heights, and Charles J. De Caro, Cleveland, Ohio, assignors to Vibratrol, Inc., Cleveland, Ohio, a corporation of Ohio Application January 16, 1952, Serial No. 266,632

13 Claims. (Cl. 188—88)

This invention relates to hydraulic shock absorbers of the cylinder and piston or strut type.

A shock absorber which has heretofore been proposed utilizes a downwardly flaring cylinder of circular cross-section, and a piston which embodies the use of an expansible and contractable piston ring of rubber or similar elastic material and a spring which tends constantly to expand the piston ring to maintain the latter engaged with the cylinder wall. The piston ring is of complicated design and has embedded therein metallic stiffening and reinforcing elements. The spring is likewise of special design.

It has been found, as the result of considerable tests conducted with a shock absorber of the foregoing type, that after prolonged use, the resiliency and other properties of the rubber piston ring as well as the spring and other parts of the piston deteriorate to such an extent that an effective seal between the piston and cylinder wall can no longer be maintained, and the usefulness of the shock absorber is greatly reduced.

The present invention has as its primary object the provision of a shock absorber of the aforesaid type which utilizes a cylinder and piston construction designed to overcome the aforesaid disadvantages and shortcomings.

Another object of the invention is to provide a shock absorber of the character described, having embodied therein a novel flared cylinder of square cross-section, which can be manufactured more accurately and at less cost than a flared cylinder of circular cross-section.

A further object of the invention is to provide a shock absorber of the character described, having embodied therein a piston or piston assembly of extremely novel construction, which is extremely durable, can be manufactured and assembled at relatively low cost, and which is virtually self-lubricating.

Other objects and advantages of my invention will be apparent during the course of the following description. In the accompanying drawings forming a part of this specification and in which like numerals are employed to designate like parts throughout the same, Fig. 1 is a central, longitudinal cross-sectional view through a shock absorber constructed in accordance with the invention, with the valve member in open position;

Fig. 2 is a cross-sectional view, taken on the line 2—2 of Fig. 1;

Fig. 3 is a fragmentary perspective view, showing two of the piston shoes;

Fig. 4 is a cross-sectional view, taken on the line 4—4 of Fig. 1;

Fig. 5 is a view similar to Fig. 1, but with the valve member closed;

Fig. 6 is a cross-sectional view, taken on the line 6—6 of Fig. 5, and

Fig. 7 is an exploded view of the component parts of the valve member adjusting means.

Referring more particularly to the drawings, reference numeral 10 designates generally the cylinder of the present shock absorber, this cylinder being of square cross-section, and formed of plates 11, 12, 13 and 14, which are secured to each other in any desired manner which provides an air-tight seal at the joints between the plates.

The aforesaid cylinder is closed at its upper end by means of a head 15, and at its lower end by means of a removable head 16, these heads being secured to the ends of the cylinder in any desired manner which provides an air-tight seal at the joints between the cylinder plates and heads.

The head 15 has an axial bore 17, through which a piston rod 18 extends, the piston rod carrying at its lower end a piston assembly, generally indicated by reference numeral 19, which is slidable in the cylinder and divides the cylinder into upper and lower chambers or compartments a and b respectively.

The cylinder 10 is surrounded by a jacket 20 of substantially square cross-section which is spaced from the cylinder 10 to provide between the same and the cylinder a liquid reservoir c. The cylinder chambers a and b and the reservoir c are substantially filled with a suitable liquid. The jacket 20 is closed at its upper end by a cover plate 21 having a central opening 22 through which the piston rod 18 passes. The plate 21 also bears against the upper end of the cylinder head 15.

The cylinder head 15 has a recess 23 therein, in which a seal 24 of any desired construction may be disposed.

The jacket 20 is closed at its lower end by a cover plate 27, which is secured, as by screws 28, to a frame 29 which is welded or otherwise permanently secured to the outer surface of the jacket adjacent the lower end thereof.

Depending upon the particular use to which the shock absorber is to be put, the cylinder 10 may be of any suitable length and cross-sectional dimensions. Essentially, however, the cylinder is flared downwardly, that is to say, in the direction in which the piston assembly moves therein when the shock absorber is subjected to impact or compression loads. The degree of flare is arbitrary, depending upon the particular use to which the shock absorber is to be put.

The lower end of the piston rod 18 is reduced in diameter, as at 30, to form a shoulder 31, and below the portion 30, the rod is provided with threads 32 for the attachment to the rod of the piston assembly 19.

The piston assembly comprises a shoe retainer plate 33 which is mounted on the portion 30 of the piston rod and is maintained against the shoulder 31 by the collar 34 of a second shoe retainer plate 35, the collar 34 being secured to the threaded portion 32 of the piston rod. The plates 33 and 35 are thus spaced vertically from each other and are provided with sets of circumferentially-spaced aligned openings 36 and 37 respectively.

The piston assembly further comprises four metallic shoes 38, which form the piston proper, and which are disposed and fill the space between the retainer plates 33 and 35 and are slidable relatively to the latter. Each shoe 38 comprises a body portion 39, having a lateral extension 40 which is shaped to conform to the curvature of the collar 34, a tenon 41 extending from the upper portion of one end of the body 39, and a tenon 42 extending from the lower portion of the other end of the body 39. The shoes are so assembled that the tenon 41 of each shoe overhangs and slides on the tenon 42 of an adjacent shoe, so that the shoes collectively form a piston of square cross-section, which is free to expand or contract radially to conform to the varying cross-section of the flared cylinder wall, whereby a fluid tight seal is maintained between the piston and cylinder wall at all times during movement of the piston up and down in the cylinder.

The piston shoes 38 are spring loaded, that is to say, pressure is constantly exerted on the shoes so as to maintain the shoes in fluid-sealing relation to the cylinder wall at all times. This is accomplished by means of compression coil springs 43 which are interposed between the body 39 of each shoe and the tenon 42 of the adjacent shoe, the ends of these springs being disposed in suitable recesses in the shoes, so as to prevent their displacement from the shoes.

The piston rod 18 has an axial bore 44 in its lower end, which is counterbored, as at 45. A port 46 extends radially through the piston rod from the upper end of the counterbore 45 and a port 47 of slightly larger diameter than the bore 45 extends radially through the piston rod from the upper end of the bore 44. Disposed in the bore 44 and slidably fitted therein is a valve member 49 which has an axial bore 50 opening through its lower end, but which is closed at its upper end, and between its ends, is provided with a lateral port 51 in communication with the bore 50. The valve member 49 is shouldered for engagement with a shoulder 52 on the piston rod, so as to provide means for limiting the upward movement of the valve member in bore 44. A compression coil spring 53 constantly urges the valve member 49 upwardly so as to maintain the latter at its limit of upward movement within the bore 44. The spring 53 is seated on a hollow nut 54, which is threadedly secured within the lower end of the collar 34, and is provided with a depending lug 55, which serves a purpose to be presently described.

The cover plate 27 of the jacket 20 is provided with a large central threaded opening 56 in which a closure member 57 is threadedly secured, the member 57 being provided with a flange 58 which extends into an opening 59 in the cylinder head 16. The flange 58 is provided with a series of circumferentially-spaced ports or openings 60, which afford communication between the reservoir c and the cylinder chamber b under the control of a check valve 61 in the form of a ring of rubber or equivalent material. The inner portion of the ring 61 seats downwardly upon the upper face of the flange 58 to cover and close the ports 60 and is upwardly flexible to uncover or open said ports. A backing ring 62 of resilient sheet metal or other suitable material is superimposed upon the ring 61 and the marginal portions of the rings 61 and 62 are clamped between the flange 58 and a flange 63 extending from the cylinder head 16 in overhanging relation to the flange 58. The backing ring 62 tends constantly to urge the ring 61 to its port closing position, but in order that the inner portion of the ring 62 may flex upwardly, said portion of the ring 62 is notched at circumferentially-spaced points, as indicated at 64.

The closure member 57 is provided in the center of its upper face with a recess 65 in which a cylindrical member 66 is disposed, the member 66 having a pair of diametrically-opposed vertical slots 67 and 68 therein, extending upwardly from the lower end of the member. The member 66 has an inwardly extending flange 69 at its upper end, defining a central opening 70. Mounted to slide in the opening 70 is an element 71 having a base flange 72 provided with pins 73 and 74 which extend radially from diametrically-opposite sides of the flange 72 and into the slots 67 and 68 respectively. The element 72 is slotted at points 90 degrees from each other, to provide slots 75 adapted, at times, to receive the lug 55 of the nut 54. A compression coil spring 76 is interposed between the base of the recess 65 and the bottom of the element 71, so as to normally urge the base flange 72 of the element 71 into contact with the flange 69 of the member 66.

The check valve ring 61 prevents escape of liquid from the lower cylinder chamber b through the ports 60 into the reservoir c. Consequently, when the piston 19 moves downwardly in the cylinder 10 in response to compression or impact loads imposed upon the shock absorber, the liquid in the chamber b is subjected to pressure and since it has no other avenue of escape from said chamber other than past the piston into the upper cylinder chamber a, it flows upwardly through the openings 37 and 36, and into the cylinder chamber a.

Due to the downwardly flaring form of the cylinder 10 and to the presence of the piston rod 18 in the cylinder chamber a, said chamber a is unable to accommodate all of the liquid that enters the same from the cylinder chamber b when the piston 19 moves downwardly in the cylinder 10. Therefore, there is provided in the cylinder 10 adjacent to the top thereof, a small orifice 77 through which liquid may escape from the cylinder chamber a into the reservoir c. The size of this orifice determines the amount of liquid which may escape from the cylinder space a under any given pressure developed in said chamber and hence determines the rate of downward movement of the piston 19 in the cylinder 10 under any impact or compression load imposed upon the shock absorber. In this connection, since the cylinder 10 flares downwardly and the frontal area of the piston 19 progressively increases with downward movement of said piston, the resultant effect is that the present shock absorber acts to offer progressively increasing resistance to impact or compression loads imposed upon the same whereby shocks incident to such loads are absorbed gradually and smoothly. Obviously, the size of the orifice 77 and the amount of flare of the cylinder may be such as to adapt the shock absorber, for any given installation thereof, best to resist and absorb impact or compression loads to which it may be subjected. By flaring the cylinder in the direction in which the piston moves therein when the shock absorber is subjected to impact or compression loads, and by utilizing a piston of novel expansible and contractable form for cooperation with said cylinder and permitting limited flow of liquid past the piston from the larger to the smaller end of the cylinder as the piston moves toward the larger end of the cylinder under impact or compression loads imposed upon the shock absorber, the shock absorber offers progressively increasing resistance to such loads and operates smoothly and efficiently in absorbing shocks incident to such loads.

When the valve member 49 is at its limit of upward movement in the bore 44, as in Fig. 5, its upper end is disposed below the port 46, and its port 51 is disposed above the port 47, so that communication between the cylinder chamber a and the bore 50 of the valve member is denied. Moreover, the arrangement in this respect is such, as shown, that pressure generated in the chamber b by downward movement of the piston 19 in the cylinder 10 acts upwardly upon the valve member to assist the spring 53 in maintaining the same in its uppermost position, denying communication between the chamber a and the chamber b. When, however, the piston 19 moves upwardly in the cylinder 10 responsive to rebound load imposed upon the shock absorber, pressure is generated in the cylinder chamber a with the result that the liquid in said chamber acts through the port 46 upon the top of the valve member 49 to urge the latter downwardly until communication is established through the ports 47 and 51 between the cylinder chamber a and the bore 50 of said valve member. Liquid may then flow from the upper cylinder chamber a through the ports 47 and 51 and the bore 50 of the valve member 49 into the lower chamber b. The amount that the valve member 49 moves downwardly under any given pressure generated in the cylinder chamber a depends, of course, on the strength of the spring 53. Moreover, the amount of opening of the port 47 and therefore, the amount of liquid which may flow from the chamber a to the chamber b depends upon the amount of downward movement of the valve member 49. Manifestly, therefore, by a proper selection of the strength of the spring 53, the shock absorber may be best adapted in any particular installation of the same to resist and absorb rebound loads to which it may be subjected.

Since the nut 54, upon which the lower end of the spring 53 is seated and from which said spring 53 reacts to urge the valve member 49 upwardly, is adjustable, by adjusting said nut upwardly or downwardly, the strength of the spring 53 may be increased or decreased to determine the pressure under which the valve member 49 will be moved any given amount downwardly to permit any given amount of liquid to flow from the cylinder chamber $a$ to the cylinder chamber $b$. In short, by adjusting the nut 54 to vary the strength of the spring 53, the shock absorber may be best adapted in any given installation theretof to resist and absorb rebound loads to which it may be subjected. In fact, since the spring 53 may be operated at free height by sufficient downward adjustment of the nut 54, a partially open orifice 47 can be provided if the need of additional static orifice area, other than that provided by the orifice 77, should be found necessary.

To provide for convenient and easy adjustment of the nut 54, the piston 19 may be moved to its limit of downward movement in the cylinder 10 to thereby cause the lug 55 of the nut to enter one or the other of the pairs of slots 75 in the element 72. With the lug so engaged in the slots, the nut will be held against rotation relatively to the cylinder 10, so that by rotating said cylinder and the piston rod 18 relatively to each other, said nut may be adjusted for the purpose stated.

Since not enough liquid flows from the cylinder chamber $a$ to the cylinder chamber $b$ to maintain the latter cylinder chamber filled with liquid when the piston 19 moves upwardly in the cylinder 10, the check valve 61 opens during upward movement of the piston and enough liquid enters the cylinder chamber $b$ from the reservoir $c$ to maintain said cylinder chamber $b$ filled with liquid.

During upward movement of the piston 19 some liquid escapes from the cylinder chamber $a$ through the orifice 77 into the reservoir $c$. However, the valve member 49 mainly controls flow of liquid from said cylinder chamber $a$ during upward movements of the piston 19 and the adjustment of the spring 53 takes into account the amount of liquid which escapes from the chamber $a$ into the reservoir $c$ via the orifice 77, whereby the shock absorber acts smoothly to absorb shocks incident to rebound loads imposed upon the same.

Due to the characteristics of the present shock absorber, the amount of liquid contained in the reservoir $c$ varies with upward and downward movements of the piston 19 in the cylinder 10. Therefore, the shock absorber is supplied with an amount of liquid such that when the reservoir $c$ contains the least amount of liquid the port 77 is covered with liquid and sufficient space remains in the reservoir to accommodate the greatest amount of liquid which it at any time is required to contain.

Assuming the present shock absorber to be interposed between the running gear and the body of a vehicle in which the body is supported upon the running gear by springs, and that the piston 19 normally is disposed intermediate the ends of the cylinder 10, it will be apparent that if the running gear passes over an obstruction in a roadway and thereby is elevated relative to the vehicle body, the cylinder 10 and the piston 19 will move upwardly and downwardly, respectively, relative to each other, with the result that liquid will be forced from the chamber $b$ past the piston 19 into the chamber $a$ and from said chamber $a$ through the orifice 77 into the reservoir $c$, with the result that the impact or compression shock will be absorbed in the manner heretofore described. It will also be apparent that upon downward movement of the vehicle running gear relative to the vehicle body, either following passage of the running gear over an obstruction in the roadway or due to the running gear dropping into a depression in the roadway, the cylinder 10 and the piston 19 will move downwardly and upwardly, respectively, relative to each other with consequent development of pressure in the chamber $a$ and snubbing of the rebound forces in the manner heretofore described.

The use of a tapered cylinder of square cross-section is highly advantageous, since such a cylinder can be manufactured and assembled from flat plates which can be easily machined, at low cost, and with great accuracy.

The piston construction, embodying the use of slidable shoes, and consisting of metallic parts only, is of advantage, not only from the standpoint of long life and maintenance of a highly efficient seal throughout the life of the shock absorber, but has the added advantage that the shoes and other parts can be made and assembled at low cost, and can be easily replaced. Moreover, the various parts of the piston are self-lubricating, that is to say, the lubricating fluid in the shock absorber has ready access to all moving parts and surfaces, through the openings 36 and 37, and are maintained constantly in a lubricated state. In this connection, it may be noted that the openings 36 and 37 are very close to the piston rod, so that they are not closed by the piston shoes until the piston is close to the upper end of its upward stroke. It may also be noted that at all other times, the fluid in the cylinder can enter the openings 36 and 37 and pass into the space between the plates 33 and 35, so as to assist in maintaining the piston shoes pressed against the cylinder wall, equalizing the pressure on such shoes.

The use of the spring 76 presents a further advantage in that it cushions the downward movement of the lug 55 on the nut 54, so as to prevent breakage of this lug during use of the shock absorber.

From the foregoing description, considered in connection with the accompanying drawings, it is believed that the construction and operation of the present shock absorber will be clearly understood and its advantages appreciated. It is desired to point out, however, that while only a specific structural embodiment of the invention has been illustrated and described, the same is readily capable of specifically different structural embodiments within its spirit and scope, as defined in the appended claims.

Having thus described my invention, I claim:

1. In a shock absorber of the character described, a downwardly flared cylinder of non-circular cross-section, a piston mounted for reciprocal movement in said cylinder and in contact with the walls of said cylinder at all times during reciprocation thereof.

2. A shock absorber, as defined in claim 1, in which said cylinder is of rectangular cross-section.

3. A shock absorber, as defined in claim 1, in which said cylinder is of square cross-section.

4. In a shock absorber of the character described, a uniformly and downwardly flared cylinder of square cross-section, and a piston mounted for reciprocal movement in said cylinder, said piston comprising shoes slidable relatively to each other and to the walls of said cylinder.

5. A shock absorber, as defined in claim 4, in which means are provided for resiliently urging said piston shoes radially-outwardly towards the walls of said cylinder.

6. A shock absorber, defined in claim 5, in which each shoe has a forwardly extending tenon and a rearwardly extending tenon, the forwardly extending tenon overlying and sliding upon the rearwardly extending tenon of an adjacent shoe.

7. A shock absorber of the character described, comprising a piston rod, a pair of spaced plates secured to said piston rod, piston shoes disposed between said plates, said shoes being slidable radially outwardly relatively to the axis of said piston rod, and spring means urging said shoes outwardly, said plates having openings therein adapted to permit fluid flow into the space between said plates.

8. In a shock absorber of the character described, a cylinder having a downwardly flared inner wall of non-circular transverse cross section, a piston mounted for reciprocal movement in said cylinder, said piston comprising means in fluid sealing engagement with said wall at all times during reciprocation of said piston.

9. A shock absorber, as defined in claim 8, in which said inner wall is of rectangular cross-section.

10. A shock absorber, as defined in claim 8, in which said inner wall is of square cross-section.

11. In a shock absorber of the character described, a cylinder having a uniformly and downwardly flared inner wall of square transverse cross-section, and a piston mounted for reciprocal movement in said cylinder, said piston comprising shoes slidable relatively to each other and to said inner wall, whereby to establish fluid-sealing engagement between said shoes and wall at all times, irrespective of the position of the piston in the cylinder.

12. A shock absorber, as defined in claim 11, in which means are provided for resiliently urging said piston shoes radially-outwardly towards said cylinder wall.

13. A shock absorber of the character described, comprising a cylinder having a downwardly flared inner wall of non-circular transverse cross-section, a piston comprising shoes collectively forming a piston of cross-section corresponding to said transverse cross-section, said piston mounted for reciprocal movement in said cylinder, said piston being free to expand or contract radially to conform to the varying cross-section of the flared cylinder wall, whereby a fluid-tight seal is maintained between the piston and cylinder walls at all times during movement of the piston up and down in the cylinder.

References Cited in the file of this patent

UNITED STATES PATENTS

| | | |
|---|---|---|
| 167,023 | Richards | Aug. 24, 1875 |
| 695,775 | Williams | Mar. 18, 1902 |
| 1,529,721 | Ross | Mar. 17, 1925 |
| 1,747,306 | Kolodziej | Feb. 18, 1930 |
| 2,073,888 | Toward | Mar. 16, 1937 |

FOREIGN PATENTS

| | | |
|---|---|---|
| 452,731 | France | May 22, 1913 |
| 277,591 | Great Britain | June 22, 1927 |